Oct. 30, 1962   R. B. McLEMORE   3,061,824
TRANSMITTING APPARATUS
Filed Nov. 29, 1960
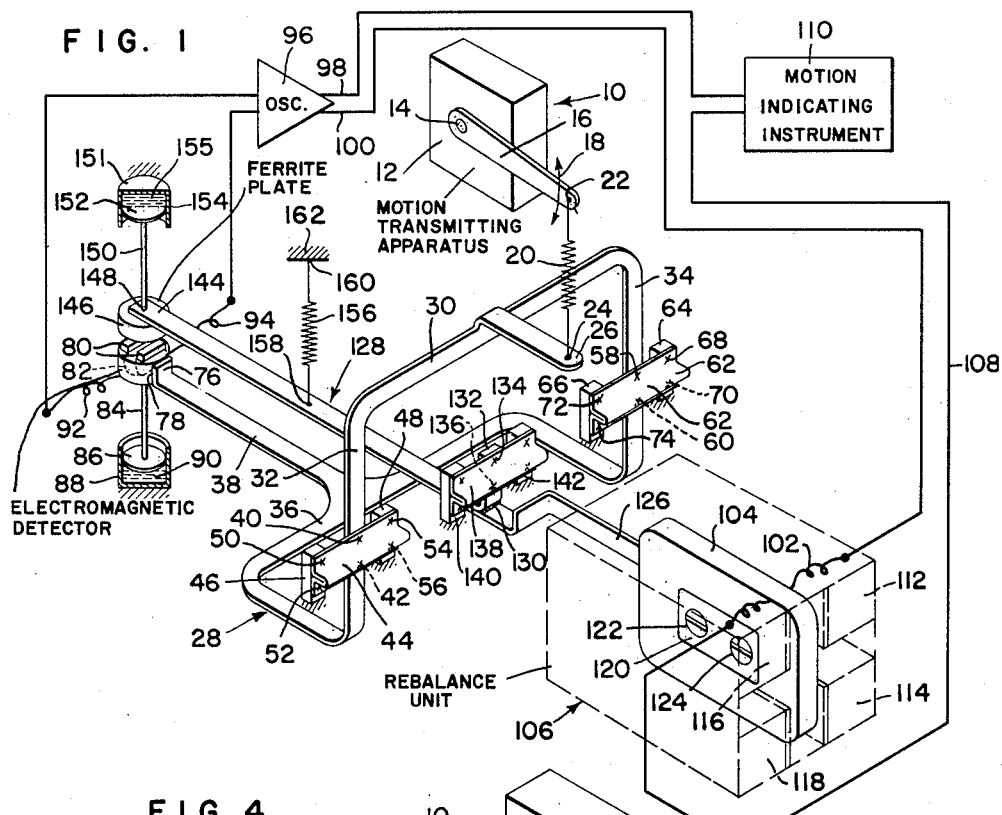
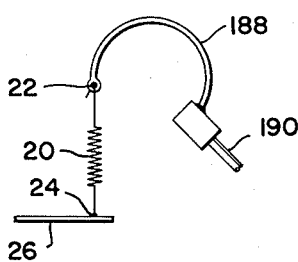
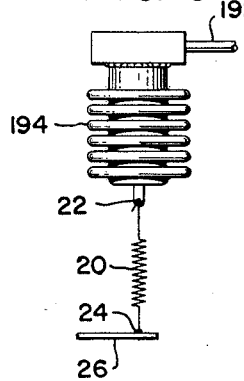
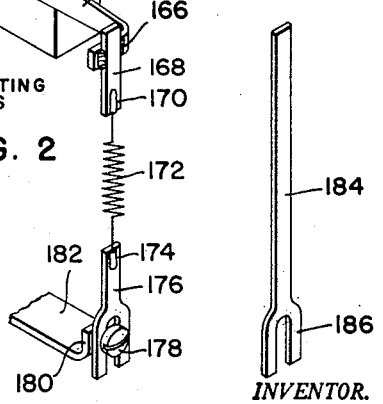
INVENTOR.
ROBERT B. McLEMORE
ATTORNEY.

United States Patent Office 3,061,824
Patented Oct. 30, 1962

3,061,824
TRANSMITTING APPARATUS
Robert B. McLemore, Oreland, Pa., assignor to Minneapolis-Honeywell Regulator Company, Minneapolis, Minn., a corporation of Delaware
Filed Nov. 29, 1960, Ser. No. 72,465
10 Claims. (Cl. 340—187)

The general object of the present invention is to provide an apparatus for transforming the motion being produced by a movable member into an electrical current that is proportional to this motion.

The present invention relates to improvements in condition responsive measuring apparatus and particularly concerns itself with an electromechanical transducer for producing an electrical signal that has a prescribed direct linear relationship with the magnitude of the output motion of either a partially rotatable member or a distensible member.

More specifically it is one of the objects of the present invention to provide an electromechanical transducer to measure displacements of either a motion applying member such as a torque tube, or the motion of a distensible member that is experienced, for example by a Bourdon tube or a bellows when a fluid pressure is applied to either of these elements.

It is another object of the present invention to provide an improved transmitter having an electromechanical transducer in which there is employed two floating beams, each pivotally mounted to rotate about separate torsional pivots which have a common center to thereby enable substantially all the torque of the rotatable or distensible member applying a motion thereto to be transferred to a first one of the floating beams to move it about its center with substantially no friction being introduced into the transmitter.

It is still another object of the present invention to provide the second one of the floating beams with a coil which is arranged to apply a motion to the second beam which will position balance the motion being applied to the first mentioned floating beam.

More specifically, it is another object of the present invention to provide a transforming apparatus of the aforementioned type that is useful in accurately responding to extremely small changes in torque that take place in a torque tube that is representative of the magnitude of a measured condition such as a change in the buoyant force of the fluid acting on a float element of a liquid level measuring device.

It is still another object of the present invention to provide an improved transmitting apparatus of the type referred to supra which, because of its double floating beam construction and its substantially frictionless low torque type pivots can afford a more accurate transformation of a motion, such as the motion of a liquid level displacer, into an electrical signal than is possible with prior art devices used for this purpose.

Of the drawing:
FIG. 1 represents one form of the present invention utilized as a motion to current transducer in an electrical position balancing type of apparatus.

FIG. 2 discloses one modified form of the apparatus disclosed in FIG. 1 for applying an adjustable predeterminable spring force to an input lever applying an input motion thereto.

FIG. 3 discloses still another modified form of the apparatus disclosed in FIG. 1 or FIG. 2 in which an adjustable flexible plate of a forked-shaped configuration is used in lieu of the coil spring shown in FIG. 1.

FIG. 4 shows one form of a distensible member that can be substituted for the input motion applying member that is shown in FIG. 1.

FIG. 5 shows still another form of a distensible member that can be substituted for the input motion applying member that is shown in FIG. 1.

FIGURE 1 of the drawing discloses a chamber 10 protruding through one wall 12 of chamber 10 there is shown a rotatable element 14, which may be a torque tube or any rotatable shaft. A lever 16 is shown fixedly positioned on the outer end of this rotatable element 14 for arcuate rotation therewith in the direction of the arrows 18.

It should be understood that, this arrangement, whereby motion is being transmitted through the wall 12 of the chamber 10 by way of a shaft or torque tube 14 and lever connected thereto, is representative of any one of a number of commercially available measuring instruments. Such a motion transmitting apparatus, while not shown in the drawing, might well be, for example, a float chamber of a liquid level displacer unit whereby minute changes in the arcuate motion of the torque tube 14 and lever 16 in the direction of the arrows 18 would be representative of changes which occur in liquid level in the enclosed container 10.

A spring 20 is shown fixedly connected by welding at one end 22 to the lever 16 and at its other end 24 to a lug 26. This lug 26 is shown as forming one bent portion of a first beam 28. This first beam 28 has a horizontal portion 30, two integral vertical portions 32, 34, a horizontal portion of U-shaped configuration 36 and a second horizontal portion 38 forming an integral portion with and extending away from the center of the base of the beam portion 36.

The vertical portion 32 of the first beam 28 is shown connected at 40 and 42 to a first low torque resilient torsional angle pivot 44 which is of T-shaped configuration and which has a substantially fixed axis of pivotation. The right and left end portions of this torsional angle pivot 44 are shown connected to associated stationary support member 46, 48 by means of welding connections at 50, 52, 54 and 56.

The other vertical portion 34 of the first beam 28 is shown connected at 58 and 60 to a second low torque resilient torsional angle pivot 62 which is of a T-shaped configuration and which has a substantially fixed axis of pivotation.

The right and left end portions of this torsional angle pivot 62 are shown connected to associated stationary support members 64, 66 by means of welding connections at 68, 70, 72 and 74.

The left end portion 38 of the first beam 28 has a bent portion 76 that is connected by welding material at 78 to a potted iron core 80. This iron core 80 has a coil 82 wound thereon which forms an electromagnetic detector. Fixedly connected to the lower end of the potted core 80 there is schematically shown a rod 84. A piston 86 is connected to the lower end of the rod 84. This piston 86 is shown mounted for movement in a stationary container 88 which contains a fluid 90 therein. The rod 84, piston 86 and container 88 which contains a fluid thus jointly form a dash pot mechanism.

The coil 82 is connected by flexible extensible lead portions 92, 94 to the oscillator 96. Leads for transmitting the output current from the oscillator 96 are shown at 98, 100. The electrical lead 100 is connected by way of its flexible end portion 102 to the coil 104 of an electromechanical position balance unit 106. This coil 104 of the feedback position balance unit 106 is shown having another flexible end portion of electrical lead 108 connected therewith and which is connected to transmit an output electrical signal therethrough to a motion indicating instrument 110.

The balancing unit 106 contains four permanent magnet units 112, 114, 116 and 118. Structural details of this type of magnet per se are disclosed in the P. E. Shafer Patent 2,847,619. The coil 104 of this unit 106 has a centrally located bobbin 120 on which the coil is wound. Two screws 122, 124 extend through the bobbin and the right end portion 126 of position balanced beam 128 and thus threadedly connect the coil 104 to this beam 128.

A central portion of the second beam 128 is shown having fixedly connected thereto by welding at 130 a vertical rectangular plate 132 at its lower end. The upper ends of the rectangular plate 132 are disclosed as being connected at 134, 136 by welding material to a third low torque, resilient, torsional angle pivot 138. The right and left end portions of this torsional angle pivot 138 are shown connected to associated stationary support members 140, 142 by means of welding connections indicated by the X mark on the drawing in a manner identical to that described supra for the connections between the pivot 44 and supports 46, 48.

Each of the torsional pivots 44, 62 and 138 are similar to the type of pivot disclosed in the previously referred to Shafer Patent 2,847,619.

The left end portion 144 of the beam 128 is shown having a ferrite plate 146 connected to its bottom surface. The bottom surface of this plate 146 faces the upper surface of the iron core 80 as is shown spaced therefrom. The shape of the ferrite plate 146 is such that as rotation of the beams 28, 128 take place and the distance between the iron core 80 and the ferrite plate 146 is varied, each portion of the lowermost surface of the ferrite plate 146 will be maintained at substantially the same varying distance from the upper surface of the iron core 80 as every other surface portion of the plate 146. Connected at 148 by welding to the upper surface of the left end of portion 144 of the second beam 128 there is schematically shown a rod 150. Connected to the upper end of the rod 150 there is a piston 152. This piston 152 is shown mounted for movement in a stationary container 154 which contains a fluid 155 therein.

It can be seen that the rod 150, piston 152 and container 154 having a fluid therein jointly form a dash pot mechanism.

FIG. 1 of the drawing also shows a suppression type extensible spring 156 connected by welding at 158 to the upper surface of the beam 128 at one end and connected at 160 to a stationary member 162 at its other end.

FIG. 2 of the drawing shows a modified form of the spring connection from that which extends between the lever 16 and the lug 26 shown in FIG. 1. FIG. 2 employs a lever 164 of an L-shaped configuration in lieu of the flat plate lever 16 shown in FIG. 1. Connected at 166 to this lever 164 there is shown a thin flexible plate 168. The upper end 170 of the spring 172 is welded to the lower end of the plate 168 and the lower end of this spring 172 is welded to the upper end 174 of a thin flexible plate 176, that is of a forked-shaped configuration. This flexible fork plate 176 is fixedly connected by means of screw 178 which screw in turn is threadedly connected to a turned-up end portion 180 of the lug 182.

It can be seen by comparing FIG. 1 arrangement with that of FIG. 2 that the only difference in the lugs 26 and 182 shown in these figures is that in FIG. 1 the lug 26 is flat and in FIG. 2 it has a turned-up portion to accommodate the adjustment of the fork lever in a vertical direction. With the screw 178 in an unloosened position the fork plate can be moved downward against the bias of spring 172 or allowed to move upward to a desired position. The position of the spring 172 can then be fixed by tightening the screw 178. It can thus be seen that one can increase or decrease the spring force being applied to the input lever 164 by making use of the arrangement disclosed in FIG. 2.

When it is desired to employ the type of apparatus disclosed herein to directly measure the motion being produced by the movable member 16 it should be understood that the type of suppression spring arrangement 20 shown in FIG. 1 or the adjustable suppression spring 168—172 shown in FIG. 2 can be omitted and replaced by inserting a thin flexible plate connection 184 having an end 186 of a forked-shaped configuration. This additional modified form of the disclosure is shown in FIG. 3 of the drawing.

In the FIG. 3 arrangement it can be seen that adjustment of the fork lever 186 with respect to a screw is similar to that already disclosed and described supra for FIG. 2. The upper end of this flexible plate 184 is connected to the L-shaped lever 164 in a manner identical to that shown at 166 for the thin flexible plate 168 in FIG. 2.

FIGS. 4 and 5 each show a lug 26 connected at one end 24 by welding to the lower end of the spring 20 in a manner identical to that disclosed in FIG. 1. The upper end of the spring 20 shown in FIGS. 4 and 5 are attached at 22 to a movable member in a manner similar to that of FIG. 1. FIG. 4 differs from the arrangement disclosed in FIG. 1 in that FIG. 4 shows how the motion of a distensible member such as a Bourdon tube 188 can be employed to apply its input motion to the beam 28 in lieu of the motion applied by the torque tube 14 shown in FIG. 1.

FIG. 4 shows an inlet conduit 190 through which a fluid under a varying pressure to be measured is applied to the interior of the Bourdon tube 188 to expand the tube outwardly toward a flat position during an increase in the level of the pressure therein and to cause the tube 188 to return to its original curved shape upon a decrease in the pressure level of this fluid.

FIG. 5 shows an inlet conduit 192 through which a fluid under a varied pressure to be measured is applied to the inlet of bellows 194 to expand the bellows 194 during an increase in the level of the pressure of the fluid and to cause the bellows to contract upon a decrease in the pressure level of this fluid.

In the operation of the aforementioned electrical transmitting apparatus an input motion is imparted to the first motion beam 28 by the motion input unit 10, 188 or 194. This motion can be transmitted either indirectly through a spring member 20 or 172 as shown in FIGS. 1 and 2 or directly by a thin flexible fork plate 184, 186 shown in FIG. 3 to a first beam 28 to rotate this beam 28 about its pivot 44, 62. The amount of rotatable motion which this beam 28 experiences can be of an extremely small magnitude which for certain beam arrangements would not vary more than one thousandth of an inch.

The selected gradient of the torsional angle pivots 44, 62, 138, which are of a low torque construction along with the preselected gradient of the coil spring 20 are such that they enable the dual beam system 28, 128 to measure displacements of the small magnitude noted supra.

However, the motion which this beam 28 experiences is not limited to this extremely small dimension under arrangements where different dimensional relationships exist between the pivots 44, 62; 138 and the respective end portions of the beams 28, 128. The beam motion causes the iron core 80 and coil 82 connected therewith to be moved toward or away from the ferrite coil 146 depending on whether the motion being applied is of an increasing or decreasing magnitude.

Movement of the beam 28 thus causes a change in the gap between the coil 82 and the ferrite disc 146 positioned on the second pivot beam 128. This action causes a change in the inductance in leads 92, 94 and a change in the impedance of the output feedback path of the oscillator 96. A portion of the output feedback current is then fed through a follow up circuit to the feedback coil 104 of an electromechanical, position balance unit 106 by way of the flexible electrical leads 102, 108. This latter-mentioned current flow causes the coil 104 and the second beam 128 attached thereto to be repositioned about its torsional pivot 138 so that the ferrite plate 146 on this beam 128 will be moved in the same direction as the coil 82 was moved due to the change in input motion of unit 10. Movement of the beam 128 and plate 146 mounted thereon will continue in this manner until it reaches a new position balance. The gap that exists between the detector 80, 82 and magnet plate 146 before the change in input motion to the first beam 28 took place will now be very slightly increased or decreased from a preselected one thousandth of an inch value depending on whether the change in motion of the input member is greater or less than that which was originally applied to the beam 28. The arrangement is such that the change in gap between the detector 80, 82 and the magnet plate 146 will enable the oscillator to send a current to the position balance coil 104 which will cause this coil to apply a torque in a direction to the second beam 128 which will be opposed by a preselected torque of the pivot 138, on which this second beam is mounted, and the torque exerted by the spring 156. This latter action thereby affords a way of enabling the apparatus to send an output current by way of leads 98, 108 to an indicating instrument 110 whose current is proportional with the input motion.

From the aforementioned description it can be seen that the motion to electrical signal transforming position balance apparatus referred to herein is provided with two substantially friction-free pivoted beams 28, 128 which are pivoted for rotation on separate torsional pivots that have a common center and which dual pivoted beams will provide a much more sensitive apparatus for detecting changes in motion than prior art devices.

It can also be seen from reading the aforementioned description of the motion to electrical signal transforming device and comparing it with prior art devices that the iron core and coil unit 80, 82, the magnetic plate 146 and the feedback coil 104 described herein are selectively positioned at end positions on the beams 28, 128 in such a fashion that they will introduce considerably less undesired friction into the transforming apparatus than have been possible with prior art devices.

It can thus be concluded from the aforementioned remarks that the motion to electrical signal transforming apparatus disclosed herein is particularly useful in converting an extremely small motion of a movable element into an electrical signal. Because of the abnormally small amount of friction which components of this apparatus introduce this apparatus will provide a much higher degree of accuracy in its motion to electric signal transformation than is presently available with prior art motion to current transforming devices and hence can be used to measure with a high degree of accuracy extremely small displacements which prior art devices have not been able to accomplish.

What is claimed is:

1. An apparatus to tranform a mechanical displacement into a proportional electrical current, comprising a movable element, a flexible strip, one end of said flexible strip being fixedly connected to said movable element, a first beam, the other end of said flexible strip being fixedly connected to one end of said first beam, a first torsional angle pivot member, said beam being pivotally mounted to rotate about said torsional angle pivot member, an iron core having an electric wire coil wound thereon fixedly connected for movement with an opposite second end of said first beam, an oscillator circuit electrically connected to said electric wire coil and a current indicating instrument, a second beam, a second torsional pivot member, said second beam being pivotally mounted to rotate about said second torsional angle pivot member, said torsional pivots having a common central axis about which said first and second beams can be rotated, a plate of ferrite material mounted for rotation on one end of said second beam at a position which is spaced from and opposite to that of said iron core, a position rebalancing unit having opposing spaced apart stationary permanent magnets of opposite polarity and a coil member mounted for movement between said spaced apart magnets, said last mentioned coil member being electrically connected by a flexible electrical conductor to said oscillator to receive an electrical current passing therethrough whose magnitude is proportional to the magnitude of said displacement being applied by the movable member to the first beam, and said electrical current flowing through said last-mentioned coil member being operable to rotate said second beam about its associated second torsional angle pivot member in the same direction as that applied by said movable means to said first beam to thereby position balance said beams.

2. An apparatus to transform mechanical motion into an electric feedback signal that is proportional to said motion, comprising a displaceable means, a pair of elongated members, a pair of torsional angle pivots, a first one of said members having a portion midway between its ends operably positioned to rotate about one of said torsional angle pivots, the second one of said members having a portion between its ends operably positioned to rotate about the other of said torsional angle pivots, said torsional angle pivots having a common center portion about which clockwise and counter-clockwise rotation of said members can be effected, said displaceable means being operably connected to one end of said first elongated member to move it clockwise or counter-clockwise about its torsional angle pivot depending whether the magnitude of a condition is increasing or decreasing, an electromagnetic detector connected for movement with the other end of said first elongated member, a magnetic plate positioned on one end of said second beam to face said detector, a plurality of permanent magnets, a coil mounted on the other end of said second member and positioned in the magnetic field of said permanent magnets, an oscillator, an electrical feedback circuit for said coil connected by way of said oscillator to said detector and said circuit when energized being operable to transmit an electric feedback signal to said coil to cause said coil to react in the field of said permanent magnets to create a force on said second member that will position balance said beams.

3. An electromechanical position balance apparatus, comprising a first and second elongated member, each of said members being pivotally mounted to rotate about torsional angle pivots having common centers, an electromagnetic detector positioned on an end of said first member, a ferrite plate positioned on one end of said second member and positioned to face said electromagnetic detector, a displaceable input element connected to said first member, the other end of said first member being adapted to be independently moved about its angle pivot in a clockwise and counter-clockwise direction toward and away from said ferrite plate in accordance with motion being applied by said displaceable input element, an oscillator circuit, a separate coil and magnet unit associated with the other end of said second member and being operably connected to said magnetic detector by way of said oscillator circuit, said coil being operably connected to said second member to position said second member in a follow-up direction with respect to said first member thereby to effect a position balance of said members.

4. An apparatus for converting changes occurring in a mechanical motion into a proportional electric signal, comprising a distensible member, a first and second elongated means, a substantially frictionless first and second pivot member spaced apart from one another and having common aligned center portions, said first elongated means being operably positioned for oscillation about said center portion of said first pivot member, said second elongated means being operably positioned for oscillation about the center portion of said second pivot member, a flexible plate, opposite ends of said flexible plate being connected to transmit changes in motion of said distensible member to one end of said first elongated means to thereby effect a rotation of said last-mentioned means relative to said second beam about its associated pivot member, and an electromagnetic detector on the other end of said first elongated means spaced from and being in alignment with a plate of magnetic material that is located on said second elongated means, a position rebalancing coil on the other end of said second elongated means, an oscillator circuit including said detector, said rebalancing coil being operably connected to receive an electrical signal from said oscillator circuit that is proportional to the changes in motion of said distensible member to position said magnetic plate on said second elongated means toward said detector to position balance said beams upon a change occurring in the input motion of said distensible member, an electric current indicating means, and a connection for transmitting said electric signal from said oscillator circuit to said indicating means to thereby provide a visual indication of the changes occurring in the motion of the distensible member.

5. An electromechanical position balance apparatus, comprising a first and second elongated member, each of said members being mounted on separate substantially frictionless pivot means that provide substantially fixed angles of rotation and aligned centers about which said members can be rotated, an electromagnetic detector positioned on an end of said first member, a ferrite plate positioned on one end of said second member to face the detector, a distensible element connected through a flexible connection to said first member, the other end of said first member being adapted to be moved about its pivot means in a clockwise and counter-clockwise direction toward or away from said ferrite plate in accordance with expansion and contraction of said distensible member, an oscillator circuit, a separate coil and magnet unit associated with the other end portion of said second member and being operably connected to said detector by way of said oscillator circuit, said coil being connected to said second member to position said second member in a follow-up direction with respect to said first member thereby to effect a position balance of said members.

6. The electromechanical position balance apparatus defined in claim 5 wherein the pivot means about which said first member is rotated is comprised of two elongated flexible plates of T-shaped cross-section which are each respectively positioned on opposite sides of the pivot means on which the second elongated member is pivoted.

7. An electromechanical position balance apparatus comprising a first and second elongated member, each of said members being mounted on separate substantially frictionless pivot means that provide substantially fixed angles of rotation and aligned centers about which said members can be rotated, an electromagnetic detector positioned between one end of said first member and its associated pivot means, a ferrite plate positioned between the end of said second member and its associated pivot means to face said detector, a distensible element connected through a flexible connection to said first member, the other end of said first member being adapted to be moved about its pivot means toward or away from said ferrite plate in accordance with expansion and contraction of said distensible member, an oscillator circuit, a separate coil and magnet unit associated with the other end portion of said second member and being operably connected to said detector by way of said oscillator circuit, said coil being connected to said second member to position said second member in a follow-up direction thereby to effect a position balance of said members.

8. The electromechanical position balance apparatus defined by claim 7 wherein said flexible connection is comprised of an elongated flexible plate having one of its ends fixedly connected to said first member and an opposite end having an adjustable means thereon to vary the active length of said elongated flexible strip that extends between said distensible member and said first member.

9. The electromechanical position balance apparatus defined in claim 7 wherein said flexible connection is comprised of a coil spring having one end adjustably mounted on said first member to apply selected incremental decreases or increases in tension to said distensible member.

10. The electromechanical position balance apparatus defined in claim 7 wherein said flexible connection is comprised of a coil spring having one end adjustably mounted on said first member to apply selected incremental decreases or increases in tension to said distensible member, each of said pivot means being comprised of a low torque angle plate and wherein said gradient of said coil spring and said low torque angle plate together with said elongated members provides a dual pivoted beam system which can measure displacements of said displaceable element which are of a magnitude of one thousandth of an inch or more.

References Cited in the file of this patent

UNITED STATES PATENTS

| | | |
|---|---|---|
| 2,293,502 | Hermann | Aug. 18, 1942 |
| 2,437,661 | Coake | Mar. 9, 1948 |